Figure 1:
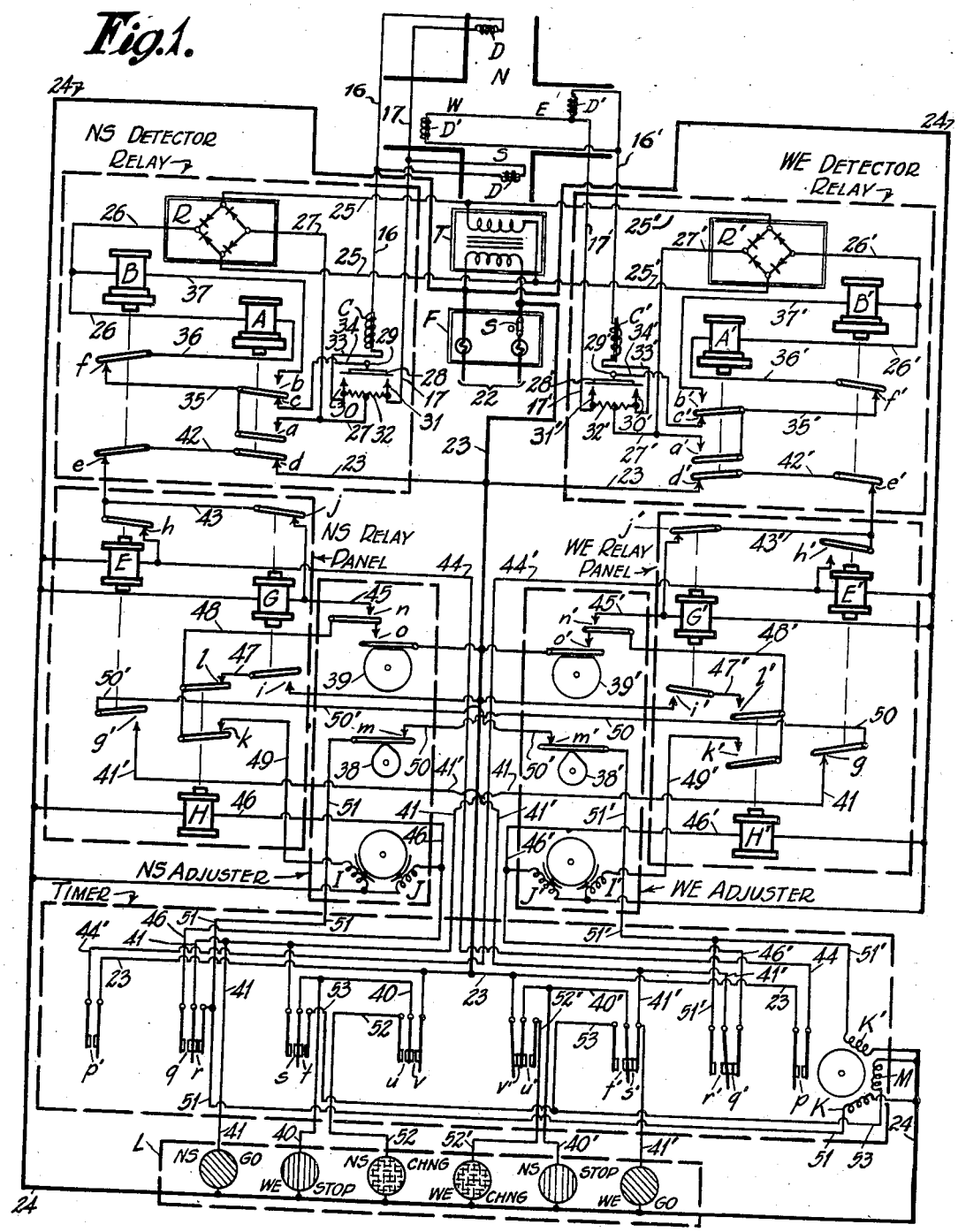

May 7, 1940.　　J. N. PAUL　　2,199,572
TRAFFIC SIGNAL
Filed April 19, 1937　　4 Sheets-Sheet 1

INVENTOR
JOSEPH N. PAUL
BY Edward Warnes
ATTORNEY

May 7, 1940.  J. N. PAUL  2,199,572
TRAFFIC SIGNAL
Filed April 19, 1937  4 Sheets-Sheet 2

FIG. 2

INVENTOR.
JOSEPH N. PAUL.
BY Lockwood, Goldsmith & Galt
ATTORNEYS.

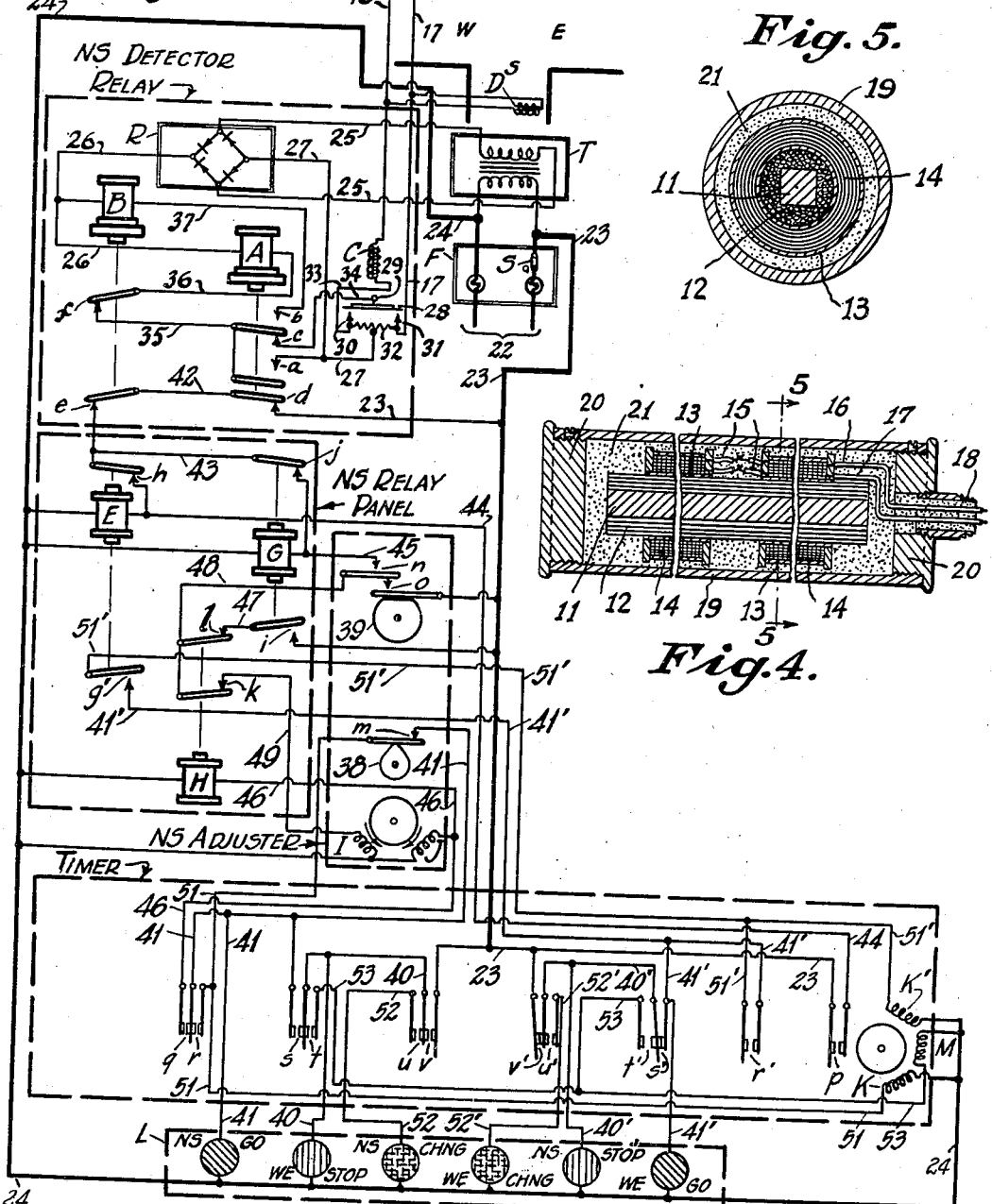

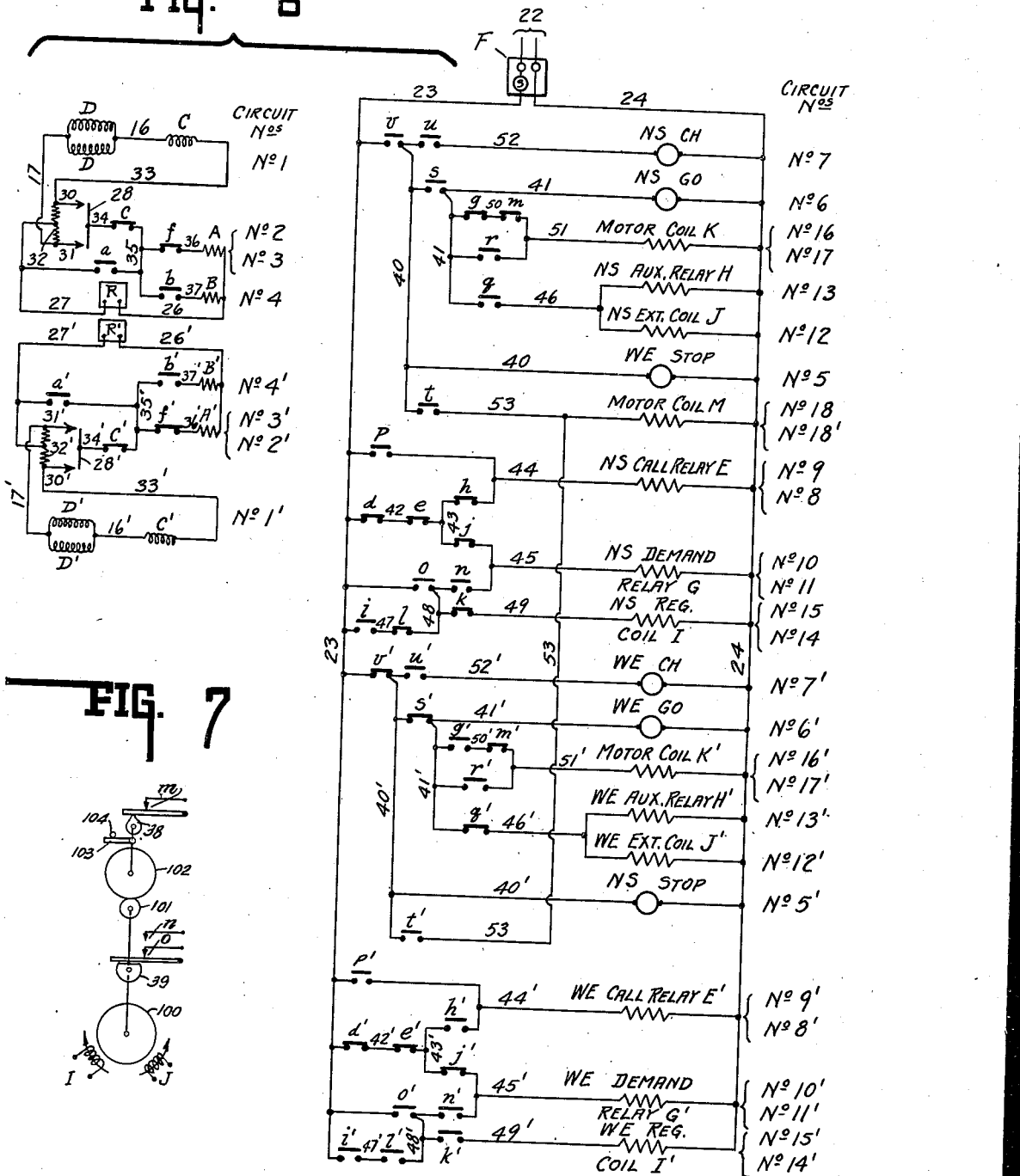

Patented May 7, 1940

2,199,572

UNITED STATES PATENT OFFICE 2,199,572

TRAFFIC SIGNAL

Joseph N. Paul, Fort Wayne, Ind., assignor, by mesne assignments, to Automatic Signal Corporation, East Norwalk, Conn., a corporation of Delaware Application April 19, 1937, Serial No. 137,705

11 Claims. (Cl. 177—337)

This invention relates to a traffic actuated signal for intersecting traffic lanes. More particularly it relates to a system in which the duration of right of way periods is proportioned between the intersecting lanes in accordance with the amount of traffic in each lane.

One object of the invention is to provide a signal system of this type which operates satisfactorily and reliably, irrespective of weather conditions and other factors which have heretofore rendered traffic actuated signals unreliable. To this end the invention employs a magnetic type of traffic actuated device or detector. In this type of detector, the passage of a vehicle disturbs a magnetic field and said disturbance in turn generates a small electromotive force which may be used to actuate the system.

Certain features of the invention reside in the arrangement of relays and control circuits, by means of which the electromotive force is made to control the display of signals. Other features of the invention reside in the control circuits per se and are equally applicable to signal systems in which a different type of detector is used.

Other objects and features of the invention will be understood from the accompanying drawings and the following description and claims:

Fig. 1 is a diagram of wiring connections for one form of the invention. Fig. 2 is a tabulation illustrating the time of operation of the switches and other elements shown in Fig. 1 during an illustrative cycle of operation. Fig. 3 is a wiring diagram of electrical connections for a second form of the invention. Fig. 4 is a longitudinal sectional view of a preferred form of traffic actuated detector. Fig. 5 is a sectional view taken substantially on the line 5—5 of Fig. 4. Fig. 6 is a wiring diagram equivalent to Fig. 1 but arranged for more convenient tracing of the circuits. Fig. 7 is a diagrammatic representation of the construction of one of the electrical units employed.

In Fig. 1 the invention is shown applied to a "full traffic actuated system" used at the intersection of two highways having fairly equal traffic volume and in which the right of way normally remains with either highway until called to the other by a traffic demand. The period of right of way in the highway to which the signal is called includes an initial period of predetermined duration, and one or more extension periods, each of predetermined duration. It may also include an idle period of indefinite duration if no calls are received from the intersecting highway prior to the end of the last extension period. The number of extension periods granted to one highway is regulated by the number of vehicles registering calls from that highway during the time that right of way is denied thereto and during at least a part of the right of way period. During the initial period and extension periods, a call from the intersecting highway is registered but is not satisfied until the last of the extension periods expires.

In Fig. 3 the invention is shown applied to a "semi-traffic actuated system" used at the intersection of a main highway and a cross road having less traffic. In this system, the right of way normally remains with the main highway until called to the cross road by a traffic demand. The period of right of way in the cross road includes an initial period and one or more extension periods but cannot include an idle period since right of way is automatically restored to the main highway at the end of the last extension period. Right of way remains with the main highway for at least a predetermined minimum period, during which calls from the cross road are registered but not satisfied until the expiration of that period.

In Fig. 1 there is indicated a street intersection in which the two highways are designated WE and NS. Traffic actuated detectors D are placed in the north and south traffic lanes in position to be actuated by vehicles approaching the intersection but not by vehicles leaving the same. Similar detectors D' are similarly placed in the east and west traffic lanes. These detectors are preferably of the form shown in detail in Figs. 4 and 5.

There are also shown in Fig. 1 an NS detector relay, a WE detector relay, an NS relay panel, a WE relay panel, an NSS adjuster, a WE adjuster and a timer, indicated by name, a fuse block F carrying a service switch S and a transformer T, all of which are preferably located in a control box placed at a convenient point adjacent the intersection. Signal lamps L are placed in suitable positions to indicate right of way to the traffic lanes. One set of lamps is shown for the NS lane, designated "NS GO", "NS CH" (change) and "NS STOP". Another set of lamps for the WE lane is correspondingly designated. Ordinarily two sets of lamps connected in parallel are provided for each lane but the second set is omitted from the diagram for simplicity.

Detectors

Each detector includes a core consisting of a bar 11 of permanently magnetized steel surrounded by a group of soft iron rods 12. Surrounding the rods 12, there are provided a plurality of spools 13 upon each of which there is wound a coil 14 of insulated wire. The coils are electrically connected by conductors 15 and the coil at one end is connected to conductors 16 and 17 leading through a suitable conduit 18 to the detector relay. The core and coils are enclosed in a pipe 19 of non-magnetic material, preferably the material known commercially as "Transite," as marketed by Johns-Manville Sales Corporation for example. Plugs 20 serve to close the ends of the pipe 19 and one of said plugs receives the conduit 18. The core and coils are held in place within the pipe 19 by a filling 21 of a waterproofing material, such as paraffin.

The detectors are buried beneath the pavement or are cast within the concrete paving slab if put in position simultaneously with the pavement. Each detector is made sufficiently long so that a car approaching the intersection must pass through at least a part of its magnetic field. The magnetic field of each detector extends beyond the ends of the detector about half the length of the detector itself. A detector six feet long placed centrally in a traffic lane 22 feet wide will be actuated by any car passing in that lane. For narrower lanes, shorter detectors may be used. For wider lanes, two or more detectors preferably are used. For a six-foot detector, preferably three of the coils 14 are used, each about 20 inches long. The magnetized bar 11 provides a magnetic field, a part of which extends above the highway surface. The soft iron rods 12 increase the permeability of the core and thus increase the change in lines of magnetic force actually threading the coils 14 which results from the passage of a vehicle containing magnetic material. When the magnetic field is disturbed by the passage of a vehicle, the resulting change in the number of lines of magnetic force threading the coils 14 induces an electromotive force therein which is applied through the conductors 16 and 17 to the electric units in the detector relay.

Power supply

Within the control box, the fuse block F is connected to power mains 22. Preferably the power supply to the mains 22 is the usual 110 volt 60 cycle alternating current. The outgoing terminals of the fuse block are connected to distributory conductors 23 and 24, carrying the same reference numbers throughout all of their branches. Within the fuse block the switch S is interposed in the line leading to the conductor 23. Branches of the distributories 23 and 24 are connected to the primary windings of the transformer T, the secondary windings of which are connected by conductors 25 and 25' to rectifiers R and R', each included in one of the detector relays. Said conductors provide the rectifiers with alternating current at a suitable low voltage, the rectifiers in turn supplying direct current on conductors 26, 27, 26' and 27' to various elements of the detector relays.

Detector relays

The NS detector relay includes a pivotally mounted detector coil C of the D'Arsonval type. Said coil, when a small current is passed through it, serves to rock a contact member 28 about a pivotal mounting 29 to make contact with either one of a pair of contact members 30 and 31 connected to opposite ends of a resistance unit 32, the midpoint of which is connected to the conductor 27.

This detector relay also includes a pair of electromagnetic relays A and B adapted to operate on the direct current received from the rectifier R. The relay A, when energized, closes normally open switches $a$ and $b$ and opens normally closed switches $c$ and $d$. The relay B, when energized, opens a pair of normally closed switches $e$ and $f$. The electrical connections and operation of the various elements of the detector relay will be described in connection with the operation of the system as a whole. The WE detector relay is a duplicate of the NS relay, primed reference characters in this relay indicating parts having the same construction and function as corresponding parts in the NS detector relay.

Relay panels

The NS relay panel carries an NS "call" relay E, an NS "demand" relay G and an NS "auxiliary" relay H. Each of these relays is of the magnetic type and is adapted to operate on the alternating current supplied from the power mains 22. The call relay E, when energized, opens a normally closed switch $g'$ and closes a normally open switch $h$. The demand relay G, when energized, opens a normally closed switch $i$ and closes a normally open switch $j$. The auxiliary relay H, when energized, opens a pair of normally closed switches $k$ and $l$.

The NS relay panel and the WE relay panel are duplicates, primed reference characters in one indicating parts having similar construction and function to correspondingly indicated parts in the other.

Adjusters

The NS adjuster is a motor operated switching unit preferably of the induction disc type the construction of which is illustrated diagrammatically in Fig. 7. It includes a "register" motor coil I and an "extension" motor coil J. The coils I and J are arranged to drive an induction disc 100 which in turn is adapted to rotate a pair of cams 38 and 39. The cams 38 and 39 are connected by gears 101 and 102, in such manner that cam 38 is turned at a much slower speed than cam 39. The coils I and J are arranged to rotate the cams in opposite directions as indicated by arrows in the diagram.

In the initial or idle position of the adjuster, the cam 38 maintains a switch $m$ in closed position and said switch is opened when said cam is moved from its initial position. In the initial position, cam 39 retains a pair of switches $n$ and $o$ in open position. When moved from its initial position, cam 39 successively closes said switches and reopens the same when a complete revolution has been made. A stop arm 103 rotated by gear 102 and engaging a stop pin 104 prevents return movement of the adjuster by coil J beyond its initial position.

The NS adjuster and the WE adjuster are duplicates, primed reference characters in the one indicating parts having similar function and construction to correspondingly indicate parts in the other.

Timer

The timer is also a motor driven switching unit preferably of the induction disc type. A suitable instrument for the purpose is disclosed in Bechtold Patent No. 1,926,833. It includes three motor coils K, M and K', any one of which serves to drive the motor and all of which turn the motor in the same direction. The motor coils may be arranged so that each moves the timer at a different rate of speed and the speed resulting from the actuation of each coil may be varied by various means, such as shading coils and adjustable pole pieces well known in the art pertaining to induction disc motors. The operation of the timer through a predetermined cycle operates switches $p'$, $q$, $r$, $s$, $t$, $u$, $v$, $v'$, $u'$, $t'$, $s'$, $r'$, $q'$ and $p$ in a predetermined sequence. The connections to said switches and their sequence of operation will be described in connection with the operation of the system as a whole.

Wiring

In describing the wiring connections, conductors will be referred to by reference number only in tracing the circuits of which they form a part. Conductors having more than one branch carry the same reference number throughout all branches. Conductors having primed reference numbers are connected to switches and relays having primed reference characters in the same manner that correspondingly numbered conductors are connected to the corresponding switches and relays. Complete circuits are referred to as circuit No. 1, No. 1', No. 2, etc. for convenience of reference and are indicated by number in the simplified diagram Fig. 6. Circuits having primed circuit numbers include conductors and switches having primed reference characters and are analogous to the corresponding circuits having unprimed circuit numbers.

Detector relay operation

The purpose of the detector relays is to amplify and prolong the effect of the electromotive force generated in the detectors to such a point that it will operate the alternating current call and demand relays with certainty and reliability. The action of the alternating current relays is then utilized to initiate the desired cycle of signal operation. In the idle position of the NS detector relay, relays A and B are both deenergized, switches $a$ and $b$ being opened and switches $c$, $d$, $e$ and $f$ being closed. Circuit No. 1 (D, 16, C, 33, 32, 17, D) is complete but no current flows therein until an electro-motive force is generated in one of the detectors D. The conductors 16 and 17 connect the two detectors D in parallel so that the actuation of either causes current to flow in the circuit. With the NS detector relay in this position, the passage of a vehicle at either detector D generates an electromotive force in circuit No. 1 which causes the detector coil C to be deflected and to move contact member 28 into contact with one or the other of the contact members 30 and 31. Assuming that contact is made at 30, circuit No. 2 (R, 27, midpoint of resistance 32, 30, 28, 34, $c$, 35, $f$, 36, A, 26, R) is completed.

Circuit No. 2 performs two functions—first, it energizes relay A and, second, the current through the circuit sets up a potential difference in the resistance 32 which is impressed upon circuit No. 1 since resistance 32 is included in that circuit. This potential difference is greater than the electromotive force generated in the detector and is in the proper direction to deflect detector coil C to press the contact member 28 more firmly against contact member 30. Thus, the fleeting impulse from the detector D is retained and amplified sufficiently for relay A to be completely energized. If the initial contact is made at 31, the result is the same since circuit 2 (or its equivalent) is completed through contact 31 and the direct potential difference is applied to the resistance 32 in the opposite direction and results in deflecting coil C in the opposite direction.

The energizing of relay A by circuit No. 2 closes switches $a$ and $b$ and opens switches $c$ and $d$. The opening of switch $c$ breaks circuit No. 2 permitting detector coil C to resume its initial position, but does not permit deenergizing of relay A since the closing of switch $a$ completes circuit No. 3 (R, 27, $a$, 35, $f$, 36, A, 26, R) which retains relay A. The opening of switch $d$ breaks an alternating current circuit to initiate the operation of the NS call and demand relays, as described hereinafter. The closing of switch $b$ energizes relay B by circuit No. 4 (R, 27, $a$, 35, $b$, 37, B, 26, R).

The energizing of relay B opens switch $f$ breaking circuit No. 3 to deenergize relay A and opens switch $e$ to prolong the break in the above-mentioned alternating circuit sufficiently to insure complete operation of the call and demand relays. The deenergizing of relay A opens switches $a$ and $b$, breaking circuit No. 4 to deenergize relay B. The opening of switch $a$ also prevents reenergizing relay A by the subsequent closing of switch $f$ (circuit No. 3). The closing of switch $c$ provides for the completion of circuit No. 2 when the next impulse from the detector is received.

Both of the relays A and B are constructed to have relatively slow demagnetization and since they operate successively, the break in the alternating control circuit through switches $d$ and $e$ is prolonged sufficiently to insure that the call and demand relays are operated. By means of the detector relay operation just described, the effect of the impulse from the detector is amplified and prolonged to a point where it will operate an alternating current relay of proper capacity positively and surely. The operation of the WE detector relay is similar in all respects.

Illustrative cycle of operations

The sequence of operation of the switches included in the alternating current circuits is shown in Fig. 2 for an illustrative cycle of operation. In this figure the cross hatched areas indicate the portion of the cycle in which each switch is closed while the blank areas indicate the portion in which the switch is open. The time during which each relay, motor coil and signal lamp is energized is also indicated by cross hatched areas. The duration of the various time periods is not shown to scale, certain periods being exaggerated for clearness and all periods being manually adjustable within wide limits.

The alternating current circuits referred to by circuit number in describing the sequence of operation of the illustrative cycle of Fig. 2 are as follows:

Circuit No. 5 (F, 23, $v$, 40 WE STOP, 24, F) displays stop signal for the WE highway.

Circuit No. 5' (F, 23, $v'$, 40', NS STOP, 24, F) displays stop signal for the NS highway.

Circuit No. 6 (F, 23, $v$, 40, $s$, 41, NS GO, 24, F) displays go signal for the NS highway.

Circuit No. 6' (F, 23, $v'$, 40', $s'$, 41', WE GO, 24, F) displays go signal for the WE highway.

Circuit No. 7 (F, 23, $v$, $u$, 52, NS CH, 24, F) displays amber cautionary signal for the NS highway.

Circuit No. 7' (F, 23, $v'$, $u'$, 52', WE CH, 24, F) displays amber cautionary signal for the WE highway.

Circuit No. 8 (F, 23, $d$, 42, $e$, 43, $h$, 44, E, 24, F) retains the NS call relay E energized.

Circuit No. 8' (F, 23, $d'$, 42', $e'$, 43', $h'$, 44', E', 24, F) similarly retains the WE call relay E'.

Circuit No. 9 (F, 23, $p$, 44, E, 24, F) re-sets the NS call relay E.

Circuit No. 9' (F, 23, p', 44', E', 24, F) resets the WE call relay E'.

Circuit No. 10 (F, 23, d, 42, e, 43, j, 45, G, 24, F) retains the NS demand relay G energized.

Circuit No. 10' (F, 23, d', 42', e', 43', j', 45', G', 24, F) similarly retains the WE demand relay G'.

Circuit No. 11 (F, 23, o, n, 45, G, 24, F) resets the NS demand relay G.

Circuit No. 11' (F, 23, o', n', 45', G', 24, F) resets the WE demand relay G'.

Circuit No. 12 (F, 23, v, 40, s, 41, q, 46, J, 24, F) energizes the extension motor coil J of the NS adjuster.

Circuit No. 12' (F, 23, v', 40', s', 41', q', 46', J', 24, F) energizes the extension motor coil J' of the WE adjuster.

Circuit No. 13 (F, 23, v, 40, s, 41, q, 46, H, 24, F) energizes the NS auxiliary relay H.

Circuit No. 13' (F, 23, v', 40', s', 41' q', 46', H', 24, F) energizes the WE auxiliary relay H'.

Circuit No. 14 (F, 23, i, 47, l, 48, k, 49, I, 24, F) energizes the register motor coil I in the NS adjuster.

Circuit No. 14' (F, 23, i', 47', l', 48', k', 49', I', 24, F) energizes the register motor coil I' in the WE adjuster.

Circuit No. 15 (F, 23, o, 48, k, 49, I, 24, F) also energizes the register motor coil I of the NS adjuster.

Circuit No. 15', (F, 23, o', 48', k', 49', I', 24, F) also energizes the register motor coil I' of the WE adjuster.

Circuit No. 16, (F, 23, v, 40, s, 41, g, 50, m, 51, K, 24, F) energizes the timer motor coil K.

Circuit No. 16', (F, 23, v', 40', s', 41', g', 50', m', 51', K', 24, F) energizes the timer motor coil K'.

Circuit No. 17 (F, 23, v, 40, s, 41, r, 51, K, 24, F) also energizes the timer motor coil K.

Circuit No. 17' (F, 23, v', 40', s', 41', r', 51', K', 24, F) also energizes the timer motor coil K'.

Circuit No. 18 (F, 23, v, 40, t, 53, M, 24, F) energizes the timer motor coil M.

Circuit No. 18' (F, 23, v', 40', t', 53, M, 24, F) also energizes the timer motor coil M.

Starting conditions—WE GO idle period

In the illustrative cycle of operations shown in Fig. 2, it is assumed that the cycle begins in the idle portion of the WE right of way period. In this period the following alternating circuits are complete, all others being open:

Circuit No. 5' displays the red "stop" signal for the NS highway.

Circuit No. 6' displays the green "go" signal for the WE highway.

Circuit No. 8 retains the NS call relay E energized with switch g' open and switch h closed.

Circuit No. 10 retains the NS demand relay G energized with switch i open and switch j closed.

Circuit No. 10' similarly retains the WE demand relay G'.

Circuit No. 12' energizes the extension coil J' of the WE adjuster. This adjuster however has already been moved to its initial position by operation of motor coil J' and is held in that position by its stop arm 103, although the coil continues to be energized.

Circuit No. 13' energizes the WE auxiliary relay H' to open switches k' and l'. The opening of these switches prevents completion of circuits 14' and 15' to actuate the register motor coil I' while coil J' is energized.

Call from NS highway

With the apparatus in the idle position just described, a call from one of the NS detectors D operates the NS detector relay to open switches d and e successively, thereby momentarily opening circuits Nos. 10 and 8. The resulting change in switch positions is indicated in Fig. 2 beneath the designation "NS CALL."

The opening of circuit No. 10 deenergizes the NS demand relay G, opening switch j and closing switch i. The opening of switch j prevents the reestablishment of circuit No. 10 when switches d and e are again closed. The closing of switch i completes circuit No. 14 to energize the register coil I of the NS adjuster. Coil I operates the adjuster to turn the cams 38 and 39 in the clockwise direction away from their initial position, opening switch m and closing switches n and o as indicated in Fig. 2 beneath the designation "REG" (register). The opening of switch m has no immediate effect since it is not included in any completed circuits at this time. The closing of switch o completes circuit No. 15 to continue the operation of the coil I after circuit No. 14 is broken. The closing of switch n completes circuit No. 11 to reenergize the NS demand relay G. The resulting action of relay G breaks circuit No. 14 and reestablishes circuit No. 10.

The register period ends when cam 39 has made a complete revolution, reopening switches n and o, thereby breaking circuit No. 15 to stop the operation of coil I and breaking circuit No. 11 to permit the demand relay G to be again deenergized by another NS traffic call. Since cam 38 moves at a slower speed than cam 39 it has turned only a fraction of a revolution from its initial position and switch m remains open. The deenergizing of the demand relay upon receipt of an NS traffic call has thus resulted in the opening of switch m, the moving of cam 38 a predetermined distance from its initial position, and the return of the demand relay and associated circuits to their initial condition ready to receive another NS call. If a second call were received the same sequence of events would result from the second breaking of circuit No. 10, and would result in moving cam 38 one step farther from its initial position. The distance that cam 38 has been moved at any given time therefore indicates the number of vehicles which have actuated the NS detectors since the adjuster was last reset in its initial position. Preferably the operation of the register coil I in turning cam 39 a full revolution is very rapid so that the demand relay is ready to receive a second call within a fraction of a second after the receipt of the first call.

The opening of circuit No. 8 upon receipt of an NS call, deenergizes the NS call relay E, opening switch h and closing switch g'. The opening of switch h prevents the reestablishment of circuit No. 8 when switches d and e are again closed. The closing of switch g' completes circuit No. 16' to energize the timer motor coil K'. The operation of this coil runs the timer from its idle position into a zone corresponding to the first change period indicated in Fig. 2.

Change period

The entry of the timer into the first change zone opens switches q' and s' and closes switches u', t' and p', the latter switch being closed only momentarily and then reopened.

The opening of switch q' breaks circuit No. 12' to deenergize the extension coil J' of the WE adjuster and place the same in condition to register a WE traffic call. Switch $q'$ also breaks circuit No. 13' deenergizing the WE auxiliary relay H', closing switches $k'$ and $l'$ to permit circuits Nos. 14' and 15' to be completed when a WE traffic call is next received.

The momentary closing of switch $p'$ completes circuit No. 9' to energize the WE call relay E', opening switch $g$ and closing switch $h'$. The closing of switch $h'$ establishes circuit No. 8' to retain the WE call relay E' energized, after switch $p'$ is opened, until a WE traffic call is received. The WE call relay has thus been reset in what may be termed its "waiting" position.

The opening of switch $s'$ breaks circuit No. 6' to extinguish the WE go signal and also breaks circuit No. 16' to deenergize the timer motor coil K'. The closing of switch $u'$ completes circuit No. 7' to display the amber cautionary signal for the WE traffic lane. The closing of switch $t'$ completes circuit No. 18' to energize the timer motor coil M which runs the timer through the change period. The duration of this period depends upon the speed at which the motor coil M is adjusted to drive the timer.

NS GO initial period

At the end of the change period, the timer enters a zone indicated in Fig. 2 by the designation "NS GO initial period." The entry of the timer into this zone opens switches $v'$, $u'$ and $t'$ and closes switches $v$, $s$ and $r$.

The opening of switch $v'$ breaks circuit No. 5' to extinguish the NS STOP signal, breaks circuit No. 7' to extinguish the WE CH signal and breaks circuit No. 18' to deenergize the timer motor coil M. The opening of switches $u'$ and $t'$ insures that only circuit No. 5' of these three will be completed when switch $v'$ is again closed.

The closing of switch $v$ completes circuit No. 5 to display the WE STOP signal. The closing of switch $s$ completes circuit No. 6 to display the NS GO signal. The closing of switch $r$ completes circuit No. 17 to energize the timer motor coil K which runs the timer during the initial period of NS right of way.

WE traffic calls during NS GO initial period

In the illustrative example of Fig. 2, it is assumed that two calls from the WE detectors are received during the NS GO initial period as indicated by the notations WE CALL. Each of said calls operates the WE adjuster by circuits analogous to those previously described in the operation of the NS adjuster and since two calls are received, the WE adjuster is left in position with cam 38' two steps away from its initial position and with switch $m'$ open.

The first of the WE traffic calls deenergizes the WE call relay, closing switch $g$ and opening switch $h'$. The closing of switch $g$ has no immediate effect and the opening of switch $h'$ prevents the reestablishment of circuit No. 8' to reenergize the WE call relay. The call relay thus remains in what may be described as its "call" position indicating that at least one call has been received from the WE traffic lane.

NS GO extension period

At the end of the NS GO initial period, the timer opens switch $r$ and closes switch $q$. The opening of switch $r$ breaks circuit No. 17 to deenergize the timer motor coil K. The movement of the timer therefore ceases since neither of the other timer motor coils is immediately energized.

The closing of switch $q$ completes circuit No. 13 to energize the NS auxiliary relay H, opening switches $k$ and $l$. The opening of these switches prevents the establishment of circuit No. 14 or 15 for the NS register coil I in case another NS call is received thereafter.

The closing of switch $q$ also completes circuit No. 12 to energize the extension motor coil J in the NS adjuster. The single NS traffic call previously received in the illustrative cycle of Fig. 2 has left the NS adjuster with cam 38 one step away from its initial position. The energizing of the extension coil J runs the adjuster cams in the counterclockwise direction to return the cam 38 to initial position during the first period marked EXT in Fig. 2. The duration of this period depends upon the speed at which the coil J is permitted to operate the adjuster.

During the extension period, switches $o$ and $n$ are closed but have no effect since switches $k$ and $l$ in the NS auxiliary relay are open. The extension period is completed when the NS adjuster has been returned by its motor coil J to its initial position and has come to rest against the stop pin 104 with switch $m$ closed and the coil J still energized. The auxiliary relay H remains energized.

If at the end of this extension period no WE traffic calls have been received, the WE call relay E' is still energized and switch $g$ is open. There is then no immediate result from the closing of switch $m$ and the apparatus remains idle until such a call is received. In the assumed illustrative cycle, WE traffic calls have been received, switch $g$ is closed and the closing of switch $m$ then completes circuit No. 16 to energize the timer motor coil K to run the timer out of its idle position into the succeeding change zone.

Second change period and WE GO period

The entry of the timer into the change zone initiates the return of right of way signals to the WE lane by circuits analogous to those previously described for transferring the right of way to the NS lane. The change period and WE GO initial period are controlled by the timer in the same manner as the corresponding periods previously described and by anologous circuits. At the end of the WE GO initial period in the assumed example of Fig. 2 two extension periods are granted, controlled by the WE adjuster. These two periods correspond to the two WE traffic calls assumed to have been received during the previous NS GO period and result from the fact that cam 38' has been moved two steps from its initial position and coil J' therefore requires twice as long to return it to initial position and close switch $m'$. Following the last of the extension periods, the apparatus enters an idle period of indefinite length since it is assumed that no further NS traffic calls have been received. This idle period corresponds to the idle period from which the illustrative cycle of Fig. 2 was started.

Summary—full traffic actuation

Briefly summarized, the full traffic actuated system just described provides for the retention of right of way in either highway until called to the other by at least one traffic demand. There follows a cautionary period and then a change of right of way to the calling highway. The calling highway retains the right of way for at least a predetermined minimum period made up of an initial period timed by the timer and one extension period timed by the adjuster. Additional extension periods are granted in response to additional traffic calls received prior to the beginning of the first extension period. Calls received from one highway during the initial and extended periods of right of way in the other highway are registered but not satisfied until the expiration of the last extension period. Such calls are counted by the adjuster and extension periods are granted in proportion to their number.

*Wiring and operation semi-traffic actuated system*

In the semi-traffic actuated system shown in Fig. 3, parts having the same reference characters as in Fig. 1 have the same construction and function. The WE traffic lane is considered a main highway and the NS traffic lane is considered a cross road having smaller traffic volume. Detectors are placed only in the cross road. The WE detector relay, WE relay panel, WE adjuster and associated circuits Nos. 8' to 15', inclusive, are omitted. Circuits Nos. 5, 5', 6, 6', 7, 7', 8, 9, 10, 11, 12, 13, 14, 15, 17, 17', 18 and 18' are the same as in Fig. 1 and function in the same manner. Circuit No. 16 is modified by the omission of switch g and may be referred to as circuit No. 16a (F, 23, v, 40, s, 41, m, 51, K, 24, F). Circuit No. 16', by the omission of switch m', becomes circuit No. 16a' (F, 23, v', 40', s', 41', g', 51', K', 24, F). In the timer, switches q' and p' are omitted.

In the operation of the system from the WE Go idle position, the receipt of one or more NS traffic calls initiates operation of the NS relays, the NS adjuster and timer by the same circuits as in Fig. 1 except that circuit 16a' performs the function of circuit 16' in moving the timer into the first change period. This results in a change of signals giving right of way to the NS lane as before. The NS GO period includes an initial period and one or more extension periods, depending upon the number of NS calls received. At the end of the last extension period, switch m in the NS adjuster is closed, immediately completing circuit No. 16a to energize timer motor coil K to move the timer into the second change period. This results in a change of signals restoring right of way to the main WE highway. The WE GO period includes an initial period timed by the timer as before, during which NS traffic calls will be registered by the call relay and adjuster but not satisfied until the end of said period. The duration of this initial period may be made as great as desired by adjustment of the speed of operation of motor coil K'. If no calls are received during the initial period and the preceding change period, at the start of which the NS call relay and adjuster were reset, then the apparatus assumes the initial idle position until such a call is received.

The foregoing specification describes a preferred form of the invention but variations in the details thereof will be apparent to those skilled in the art without departing from the scope of the invention as defined in the appended claims.

The invention claimed is:

1. Signalling apparatus for intersecting traffic lanes including in combination, a traffic actuated detector in one of said lines, signal devices indicating right of way to vehicles in said lanes, a switching unit having a movable element, means controlled by actuation of said detector during a registry period in at least a part of which right of way is denied to the lane of said detector for moving said element a predetermined distance from an initial position upon a single actuation of said detector and for moving said element a further distance from said initial position upon subsequent actuations thereof during said registry period, means operating after the expiration of said registry period and adapted to return said element to its initial position at a predetermined rate of speed, and means controlled by said switching unit and controlling said signal devices to maintain right of way in the lane of said detector during the return of said element to initial position.

2. Signalling apparatus for intersecting traffic lanes including in combination, a traffic actuated detector in one of said lanes, signal devices indicating right of way to vehicles in said lanes, a switching unit having a movable element, means controlled by actuation of said detector during a registry period in at least a part of which right of way is denied to the lane of said detector for moving said element a predetermined distance from an initial position upon a single actuation of said detector and for moving said element a further distance from said initial position upon subsequent actuations thereof during said registry period, means operating after the expiration of said registry period and adapted to return said element to its initial position at a predetermined rate of speed, and means controlled by said switching unit and controlling said signal devices to maintain right of way in the lane of said detector during the return of said element to initial position and to initiate a change of signals upon the completion of said return.

3. Signalling apparatus for intersecting traffic lanes including in combination a traffic actuated detector in one of said lanes, signal devices indicating right of way to vehicles in said lanes, a time controlled switching unit having an element movable from and to an initial position, means controlled by said switching unit to maintain right of way through said signal devices in the lane of said detector during return of said movable element to initial position, means for so returning said element at a predetermined rate of speed, whereby said element times a period of right of way the duration of which depends upon the distance said element has been moved from initial position, and means controlled by actuation of said detector during a registry period preceding said first mentioned period for moving said element a predetermined distance from its initial position upon a single actuation of said detector and for moving said element a further predetermined distance from said initial position upon each of a plurality of subsequent actuations thereof within said last mentioned period.

4. Signalling apparatus for intersecting traffic lanes including in combination a traffic actuated detector in one of said lanes, signal devices indicating right of way to vehicles in said lanes, a time controlled switching unit having an element movable from and to an initial position, means controlled by said switching unit to maintain right of way through said signal devices in the lane of said detector during return of said movable element to initial position, means for so returning said element at a predetermined rate of speed, whereby said element times a period of right of way the duration of which depends upon the distance said element has been moved from initial position, means controlled by actuation of said detector during a registry period preceding said first mentioned period for moving said element a predetermined distance from its initial position upon a single actuation of said detector and for moving said element a further predetermined distance from said initial position upon each of a plurality of subsequent actuations thereof within said last mentioned period, and means operating upon completion of said first mentioned period to initiate a transfer of right of way from the lane of said detector.

5. A traffic control system as in claim 3 and including a locking circuit and a release for the same operated by said unit as it moves away from initial position to maintain said last named means actuated for such predetermined distance after each such detector actuation.

6. A traffic control system for intersecting traffic lanes including an electrical switching and timing unit for timing a variable period of right of way for at least one of the said lanes, traffic actuated detector means to control the variation of such period, the said electrical switching and timing unit having a normal position at the end of its timing period and having a shaft and two driving members associated therewith, the first member connected with the said traffic actuated means and adapted to rotate said shaft in one direction away from the said normal position to a progressively greater extent for each of a plurality of actuations of the said traffic actuated means by traffic, and the second driving member being time controlled for rotating the said shaft during such right of way period in the opposite direction towards the said normal position to time the said right of way period so that its length is progressively increased in accordance with the number of such traffic actuations.

7. A traffic control system for intersecting traffic lanes comprising right of way signalling mechanism, traffic actuated detector means in one lane, an electrical switching and timing unit movable a variable distance from a normal position, a forward driving member for returning the said unit to its normal position at a predetermined time rate, electric circuits controlled by movement of the said unit to display a right of way signal for the lane of the said detector means during the return movement, an electrically actuated reverse driving member for moving the said unit from its normal position, and time controlled apparatus for actuating the said reverse driving member for a predetermined brief period of time in response to each of a plurality of traffic actuations of the said detector occurring during a registry period prior to the initiation of the said return movement.

8. A traffic control system for intersecting traffic lanes comprising electric right of way signalling mechanism including a time controlled cyclic switch device having a cycle of operation including alternate right of way signal periods for the respective lanes, traffic actuated detector means in one of said lanes, an electrical time switch unit having a normal position and movable a variable distance from said normal position, a forward driving member for said unit and adapted to be operated to return said unit at a predetermined time rate to its normal position, a reverse driving member for said unit adapted to be actuated to move said unit to a progressively greater distance away from said normal position for each of a plurality of such actuations, switch devices forming a part of said cyclic switch to interrupt the cyclic operation of said cyclic switch and actuate said forward driving member in a predetermined part of its cycle and to connect said detector means to said reverse driving member to actuate the latter in at least a prior part of said cycle, and switch means actuated by said switch unit only in its normal position to operate said cyclic switch through said predetermined part of its cycle to continue its cyclic operation.

9. A traffic control system for two intersecting lanes comprising electric right of way signalling mechanism including a time controlled cyclic switch device having a cycle of operation including alternate right of way signal periods for the responsive lanes, traffic actuated detector means in each of said lanes, a pair of electrical time switch units one for each lane and each having a normal position and movable a variable distance from said normal position, a forward driving member for each said unit and adapted to be operated to return its unit at a predetermined time rate to said normal position, a reverse driving member for each said unit and adapted to be actuated to move its unit a progressively greater distance from said normal position for each of a plurality of such actuations, switch devices forming a part of said cyclic switch to interrupt said cyclic operation of the latter in a part of each right of way position and to energize the cyclic switch for operation through the remainder of its cycle, an energizing circuit for operation of said cyclic switch through the first lane right of way position including a switch closed by one of said switch units only in its normal position and a switch closed by actuation of said detector in the second lane, an energizing circuit for operation of said cyclic switch through the second lane right of way position including a switch closed by the second said unit only in its normal position and a switch closed by actuation of said detector in said first lane, and additional switch devices forming a part of said cyclic switch to energize the forward driving member of said one unit when cyclic operation of the cyclic switch is interrupted in said first right of way position and to energize the forward driving member of said second unit when cyclic operation is interrupted in said second right of way position, and connections between the first lane detector and the reverse driving member of said one unit and between the second lane detector and the reverse driving member of said second unit to actuate these respective members at least in the right of way position of the opposite lane.

10. In a traffic control system for intersecting traffic lanes having right of way signal apparatus and a traffic actuated detector in one lane, the combination of an electrical switching unit having a member movable a variable distance from an initial position, time controlled means for returning said member to its initial position, cyclic switching means operating said signal apparatus and operable at a predetermined point in its cycle to initiate said return movement, electric circuits controlled by movement of said movable member to interrupt the operation of said cyclic switching means and to maintain a right of way signal for the lane of said controller during said return, electrically actuated means for moving said movable member from its initial position, and time controlled apparatus for actuating said last mentioned means for a predetermined brief period of time in response to each of a plurality of traffic actuations of said detector occurring during a registry period prior to the initiation of said return movement.

11. In a traffic control system for intersecting traffic lanes having right of way signal apparatus and a traffic actuated detector in one lane, the combination of an electrical switching unit having a member movable a variable distance from an initial position, time controlled means for returning said member to its initial position, cyclic switching means operating said signal apparatus and operable at a predetermined point in its cycle to initiate said return movement, electric circuits controlled by movement of said movable member to interrupt the operation of said cyclic switching means and to maintain a right of way signal for the lane of said controller during said return, electrically actuated means for moving said movable member from its initial position, and time controlled apparatus for actuating said last mentioned means for a predetermined brief period of time in response to each of a plurality of traffic actuations of said detector occurring during a registry period prior to the initiation of said return movement and in at least a part of which right of way is denied to the lane of said detector.

JOSEPH N. PAUL.